Patented Oct. 15, 1940

2,218,231

UNITED STATES PATENT OFFICE 2,218,231

POLYAZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application June 10, 1939, Serial No. 278,585

7 Claims. (Cl. 260—155)

This invention relates to polyazo compounds and to textile materials colored therewith. More particularly it relates to non-sulfonated nuclear polyazo compounds containing a quinoline nucleus and to the application of this class of dyestuffs to the coloration of cellulose organic derivatives.

We have discovered that a valuable series of aryyl polyazo dyes may be prepared by the diazotizing of amino azo quinolines having the general formulae:

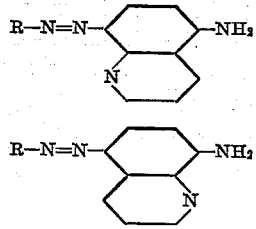

and

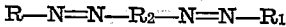

wherein R represents a benzene nucleus, and the coupling of their diazo derivatives with suitable coupling components selected from the group consisting of benzene and heterocyclic compounds capable of being coupled.

The structure of our new polyazo compounds may be represented by the following general formula:

$$R-N=N-R_2-N=N-R_1$$

wherein R represents a benzene nucleus, R$_2$ represents a quinoline nucleus attached to the azo groups in positions 5 and 8, and R$_1$ represents a member selected from the group consisting of a benzene nucleus, and a heterocyclic nucleus.

It is an object, therefore, of our invention to prepare the dyes of the class above described and to color cellulose organic derivatives, particularly cellulose acetate in the form of threads, yarns, filaments, and fabric materials therewith.

The intermediates used as the diazo components may be obtained by coupling various suitable substituted and unsubstituted 5-amino- and 8-amino-quinolines with the diazo salts of arylamines belonging to the benzene series of compounds.

The following examples illustrate the preparation of the polyazo compounds of our invention.

Example 1

One mole of 5-(2'-chlorophenyl-azo-)-8-aminoquinoline is suspended in 4500 c.cs. of water with 500 parts of 32% hydrochloric acid and diazotized with 69 grams of sodium nitrite. One mole of barbituric acid is dissolved in aqueous sodium carbonate, ice added, and the diazo solution slowly poured into this mixture. When the coupling reaction is complete, the mixture is made acid to litmus with acetic acid and the dye is filtered off, washed and dried. Cellulose acetate is colored yellow shades from aqueous suspensions of the dye.

The disazo compound thus obtained has the formula:

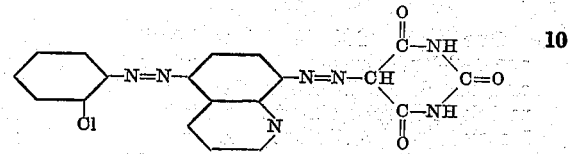

In place of barbituric acid there may be substituted thiobarbituric acid, methyl- and dimethyl dihydro resorcinol, 1-phenyl-3-methyl-5-pyrazolone, aceto acetanilide, and a coupler represented by the formula

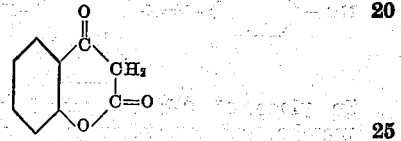

In place of 5-(2' chlorophenyl-azo)-8-aminoquinoline there may be substituted diazotization components represented by the following formulae:

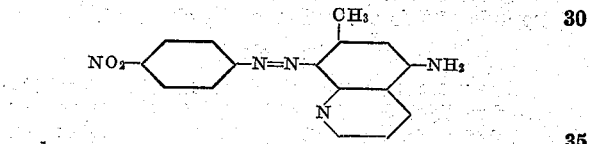

and

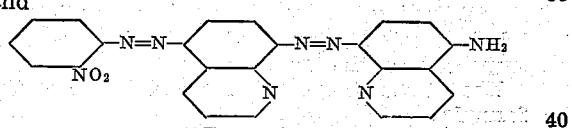

Example 2

One mole of 8-(5'-nitro-8'-azo-quinolino-)-5-amino quinoline is diazotized and coupled with p-cresol following the procedure described in Example 1. Cellulose acetate is colored orange-yellow shades from aqueous suspensions of the dye.

The disazo compound thus obtained has the formula:

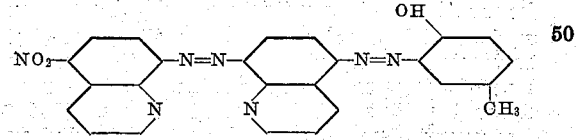

In place of the p-cresol coupler there may be substituted o- or m-cresol or resorcinol, and in place of 8-(5'-nitro-8'-azo-quinolino-)-5-amino quinoline there may be substituted the diazo components of Example 1.

Example 3

One mole of 5-(4'-nitro-6'-hydroxyphenyl-azo-)-2-hydroxy-8-amino quinoline is diazotized as described in Example 1, and the mixture added slowly to a cold aqueous solution of hydrochloric acid containing one mole of m-toluidine. The coupling reaction is completed by adding sodium acetate, after which the dye is filtered off, washed and dried. Cellulose acetate is colored red shades from aqueous suspensions of the dye.

The disazo compound thus obtained has the formula:

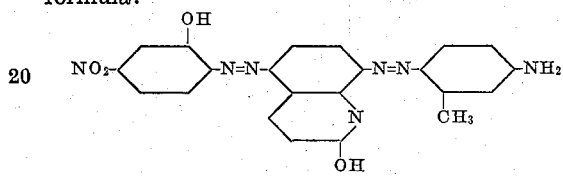

In place of m-toluidine there my be substituted m-phenylene diamine, the mono acetyl derivative of m-phenylene diamine, m-anisidine, and cresidine.

Example 4

One mole of 5-(4'-nitro-2'-hydroxy phenyl-azo-)-6-hydroxy-8-amino-quinoline is diazotized and coupled with one mole of β-hydroxy-ethyl-m-toluidine following the procedure described in Example 3. Cellulose acetate is colored red shades from aqueous suspensions of the dye.

The disazo compound thus obtained has the formula:

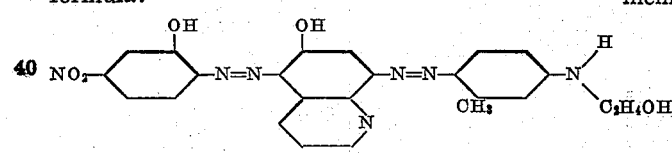

In place of β-hydroxyethyl-m-toluidine there may be used glyceryl cresidine, cetyl-m-anisidine, diphenylamine, ethyl-m-toluidine, β-sulfoethyl-2,5-dimethoxyaniline, β-methoxyethyl aniline, acetoxyethyl-m-toluidine and similar type of couplers of the benzene series. The disazo compounds of this example may be chromed.

Example 5

One mole of 8-(2'methylcarboxyphenyl-azo-)-2,7-dimethyl-5-amino-quinoline is diazotized and coupled with one mole of di-β-hydroxyethyl aniline following the procedure of Example 3. Cellulose acetate is colored red shades from aqueous suspensions of the dye.

The disazo compound thus obtained has the formula:

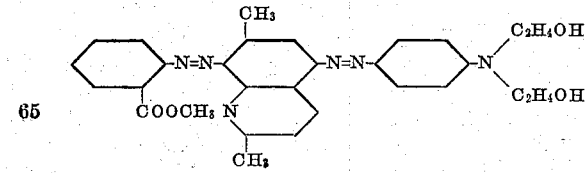

In place of di-β-hydroxyethyl aniline there may be mentioned other suitable coupling components such as diethyl aniline, dicetyl aniline, dimethyl-m-toluidine, methyl ethyl-m-toluidine, methyl butyl-2-methoxy-5-chloroaniline, ethyl-β-hydroxyethyl aniline, ethyl glyceryl aniline, ethyl-β-hydroxyethyl-m-anisidine, butyl sulfatoethyl aniline, butyl sulfoethyl-m-toluidine, di-β-sulfato-ethyl aniline, di-β-hydroxyethyl cresidine, β-hydroxyethyl glyceryl aniline, di-β-sulfoethyl aniline, di-β-methoxyethyl aniline and the like.

The polyazo compounds of our invention will ordinarily be applied to the material to be colored in the form of an aqueous suspension which can be prepared by grinding the dye to a paste in the presence of a sulfonated oil, soap, or other suitable dispersing agent and dispersing the resulting paste in water. The dispersion prepared as above is heated to a temperature approximating 45–55° C., and the organic derivative of cellulose such as cellulose acetate silk in the form of threads or fabric is immersed in the solution and the temperature gradually raised to 80–85° C., at which point it is maintained for several hours. Salt may be added as desired during the dyeing operation to promote exhaustion of the dye bath. Upon completion of the dyeing operation, the cellulose acetate silk is removed from the bath, washed with soap, rinsed and dried.

Typical organic derivaties of cellulose includes the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

We claim:

1. The non-sulfonated nuclear polyazo compounds having the general formula:

wherein R represents a benzene nucleus, $R_2$ represents a quinoline nucleus attached to the azo groups in positions 5 and 8, and $R_1$ represents a member selected from the group consisting of a benzene nucleus, a quinoline nucleus, a barbituric acid nucleus, a 1,3-cyclohexandione nucleus, and a pyrazolone nucleus.

2. The non-sulfonated nuclear polyazo compounds having the general formula:

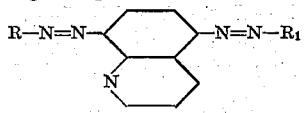

wherein R represents a benzene nucleus, and $R_1$ represents a member selected from the group consisting of a benzene nucleus, a quinoline nucleus, a barbituric acid nucleus, a 1,3-yclohexandione nucleus, and a pyrazolone nucleus.

3. The non-sulfonated nuclear polyazo compounds having the general formula:

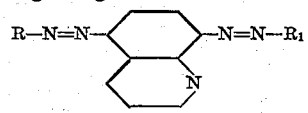

wherein R represents a benzene nucleus, and $R_1$ represents a member selected from the group consisting of a benzene nucleus, a quinoline nucleus, a barbituric acid nucleus, a 1,3-cyclohexandione nucleus, and a pyrazolone nucleus.

4. The non-sulfonated nuclear polyazo compounds having the general formula:

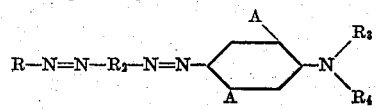

wherein R represents a benzene nucleus, $R_2$ represents a quinoline nucleus attached to the azo groups in positions 5 and 8, $R_3$ and $R_4$ each represent a member selected from the group consisting of hydrogen, an alkyl group, a hydroxyalkyl group, an alkoxyalkyl group, a sulfatoalkyl group, a sulfoalkyl group, and a phenyl group, and each A represents a member selected from the group consisting of a hydrogen, a halogen, and an alkyl group.

5. The polyazo compound having the formula:

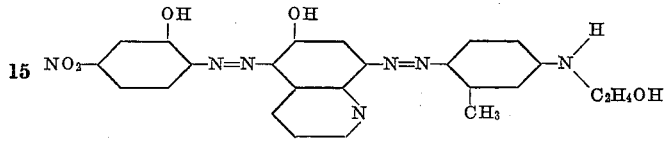

6. Material made of or containing an organic derivative of cellulose colored with a non-sulfonated nuclear polyazo compound having the general formula:

wherein R represents a benzene nucleus, $R_2$ represents a quinoline nucleus attached to the azo groups in positions 5 and 8, and $R_1$ represents a member selected from the group consisting of a benzene nucleus, a quinoline nucleus, a barbituric acid nucleus, a 1,3-cyclohexandione nucleus, and a pyrazolone nucleus.

7. Material made of or containing cellulose acetate colored with a non-sulfonated nuclear polyazo compound having the general formula:

wherein R represents a benzene nucleus, $R_2$ represents a quinoline nucleus attached to the azo groups in positions 5 and 8, and $R_1$ represents a member selected from the group consisting of a benzene nucleus, a quinoline nucleus, a barbituric acid nucleus, a 1,3-cyclohexandione nucelus, and a pyrazolone nucleus.

JOSEPH B. DICKEY.
JAMES G. McNALLY.